United States Patent
Kelley et al.

(10) Patent No.: US 7,297,892 B2
(45) Date of Patent: Nov. 20, 2007

(54) SYSTEMS AND METHODS FOR LASER-ASSISTED PLASMA PROCESSING

(75) Inventors: Jude Kelley, Belmont, CA (US); Jeffrey W. Carr, Livermore, CA (US); Peter S. Fiske, Oakland, CA (US)

(73) Assignee: RAPT Industries, Inc., Fremont, CA (US)

( * ) Notice: Subject to any disclaimer, the term of this patent is extended or adjusted under 35 U.S.C. 154(b) by 0 days.

(21) Appl. No.: 10/913,739

(22) Filed: Aug. 6, 2004

(65) Prior Publication Data

US 2005/0061783 A1    Mar. 24, 2005

Related U.S. Application Data

(60) Provisional application No. 60/495,194, filed on Aug. 14, 2003.

(51) Int. Cl.
*B23K 9/00* (2006.01)
*B23K 9/02* (2006.01)

(52) U.S. Cl. .......................... 219/121.42; 219/121.36; 219/121.47

(58) Field of Classification Search ........... 219/121.11, 219/121.36–121.39, 121.4, 121.41, 121.43, 219/121.47, 121.55, 121.56, 121.58–121.59, 219/121.6; 216/59, 63, 67; 156/345.26; 427/527; 204/192.34

See application file for complete search history.

(56) References Cited

U.S. PATENT DOCUMENTS

| | | | |
|---|---|---|---|
| 4,532,199 A | | 7/1985 | Ueno |
| 4,689,467 A | * | 8/1987 | Inoue ....................... 219/121.6 |
| 5,256,205 A | | 10/1993 | Schmitt, III |
| 5,321,224 A | * | 6/1994 | Kamimura et al. ...... 219/76.15 |
| 5,429,730 A | * | 7/1995 | Nakamura et al. ..... 204/192.34 |
| 5,639,699 A | * | 6/1997 | Nakamura et al. .......... 427/527 |
| 5,683,548 A | | 11/1997 | Hartig |
| 5,795,493 A | * | 8/1998 | Bukhman et al. .............. 216/59 |
| 6,229,111 B1 | * | 5/2001 | McCay et al. ......... 219/121.59 |
| 6,238,587 B1 | * | 5/2001 | Siniaguine et al. ........... 216/59 |
| 6,660,177 B2 | * | 12/2003 | Carr ............................ 216/63 |

FOREIGN PATENT DOCUMENTS

| | | |
|---|---|---|
| DE | WO 02/61171 A1 | 8/2002 |
| EP | 0 546 842 A1 | 6/1993 |

OTHER PUBLICATIONS

International Search Report Mailed Oct. 31, 2005.
Supplementary European Search Report, EPO, mailed Dec. 21, 2006, 4 pages.

* cited by examiner

*Primary Examiner*—K. Richard Lee
(74) *Attorney, Agent, or Firm*—Fliesler Meyer LLP

(57) ABSTRACT

A controllable heat source, such as a laser or flame torch, can be used to pre-heat a portion of the surface of a workpiece, such as a glass optic or semiconductor wafer. Reactive atom plasma (RAP) processing can be used to modify the pre-heated surface portion, as the pre-heated material will more readily chemically combine with the atomic radicals of the precursor in the plasma. A RAP torch, such as an ICP plasma torch, MIP plasma torch, or flame torch, can be used to shape, polish, etch, planarize, deposit, chemically modify and/or redistribute material on the surface of the workpiece. The material modified by the torch can substantially correspond to the pattern or portion of the surface that was pre-heated by the heat source. This description is not intended to be a complete description of, or limit the scope of, the invention. Other features, aspects, and objects of the invention can be obtained from a review of the specification, the figures, and the claims.

29 Claims, 6 Drawing Sheets

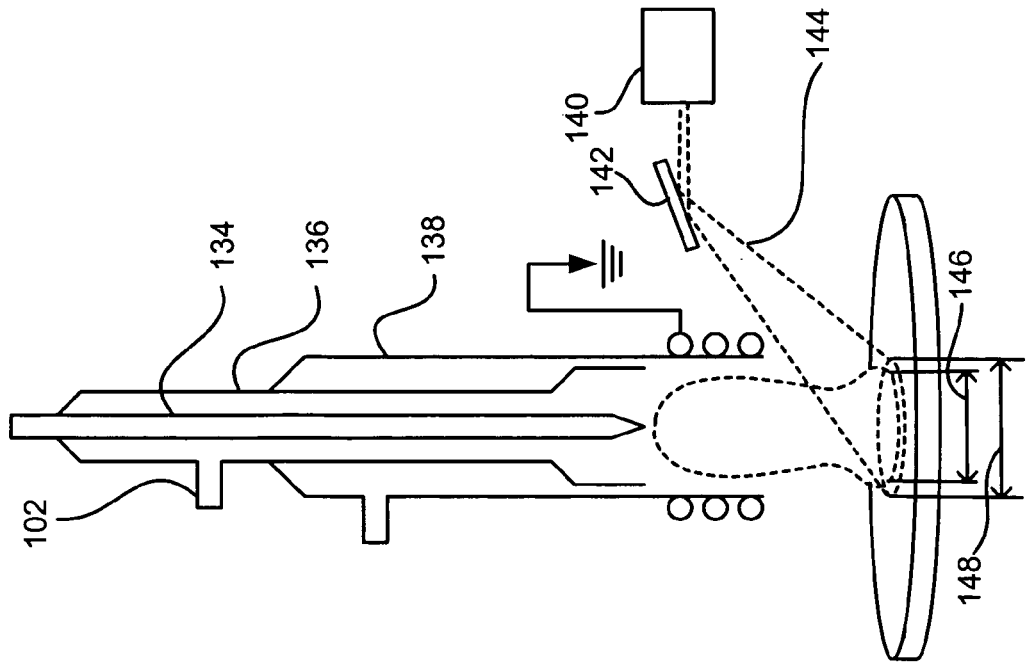
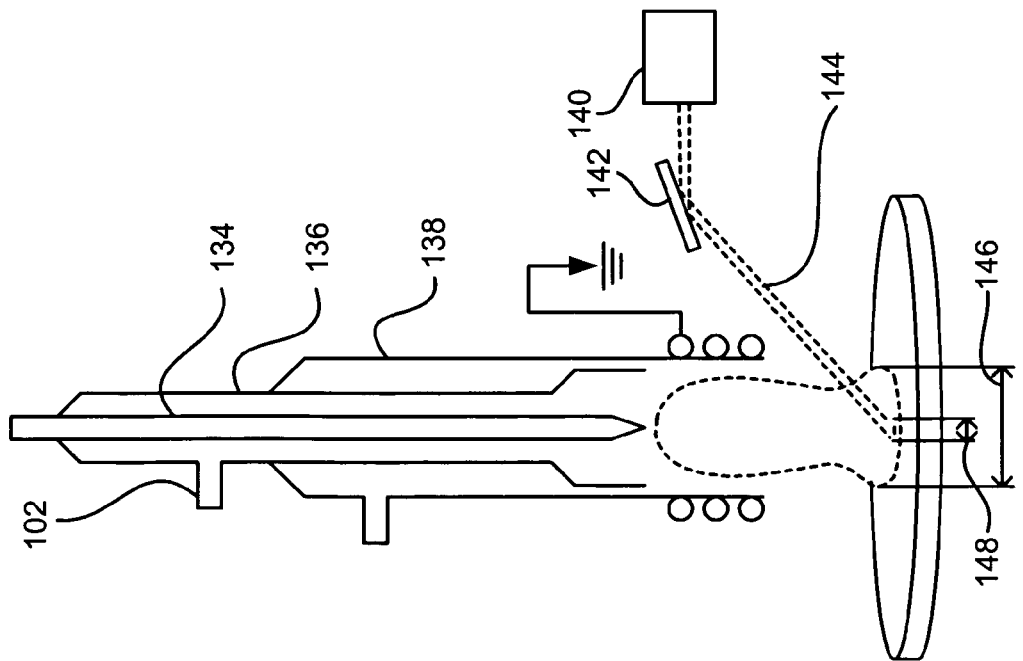

SYSTEMS AND METHODS FOR LASER-ASSISTED PLASMA PROCESSING

CLAIM OF PRIORITY

This application claims priority to U.S. provisional patent application No. 60/495,194, entitled "Systems and Methods for Laser-Assisted Plasma Processing," by Jude Kelley, et al., filed Aug. 14, 2003.

CROSS-REFERENCED CASES

The following applications are cross-referenced and incorporated herein by reference:

U.S. patent application Ser. No. 10/008,236 entitled "Apparatus and Method for Reactive Atom Processing for Material Deposition," by Jeffrey W. Carr, filed Nov. 7, 2001.

U.S. patent application Ser. No. 10/383,478 entitled "Apparatus and Method Using a Microwave Source for Reactive Atom Plasma," by Jeffrey W. Carr, filed Mar. 7, 2003.

U.S. patent application Ser. No. 10/384,506 entitled "Apparatus and Method for Non-Contact Cleaning of a Surface," by Jeffrey W. Carr, filed Mar. 7, 2003.

FIELD OF THE INVENTION

The field of the invention relates to the selective removal of material from a surface.

BACKGROUND

Modern materials present a number of formidable challenges to the fabricators of a wide range of optical, semiconductor, and electronic components, many of which require precision shaping, smoothing, and polishing. The use of plasmas to etch materials has become an important technique in the optical component and semiconductor industries. Recent advances have introduced sub-aperture plasma processes, such as reactive atom processing (RAP), which act more like traditional machining tools by etching only specific areas of a workpiece.

A plasma etching process differs from its mechanical counterpart by the mechanism in which material is removed. Traditional machine tools use mechanical parts to physically cut away material from a workpiece. Plasma etching processes, on the other hand, rely upon chemical reactions to transform the solid material of the workpiece into a volatile or otherwise labile byproduct. Plasmas offer advantages such as the contact-free removal of material, in which little to no force is exerted on the workpiece. Reliance upon a chemical means of material removal introduces a whole new set of factors to consider when treating a material.

The activation energy ($E_a$) is an important factor to consider in any chemical reaction, as the activation energy is a type of 'energy barrier' for a reaction. Without sufficient energy, a given set of reactants will not react. $E_a$ varies from reaction to reaction, and can be an important factor in determining the rate of a given chemical reaction at a specific temperature. The relationship between temperature, rate, and activation energy is described by the Arrhenius equation:

$$k = Ze^{-E_a/RT}$$

where k is the reaction rate constant, Z is a proportionality constant that varies from reaction to reaction, Ea is the activation energy, R is the ideal gas constant, and T is the temperature.

For example, a process by which SiC is etched using F radicals will not produce any measurable material removal below a specified temperature, designated herein as temperature A. Given this situation, the traditional approach has been to increase the temperature of the entire SiC workpiece to a temperature of A or higher. This heating can be accomplished with the plasma torch itself, usually by a programmed preheating program, or by electric heating coils embedded in a temperature-controlled part chuck. Once the desired temperature is reached, and maintained, etching with the sub-aperture plasma can proceed similarly to scenarios where the material being etched has a negligible $E_a$. Some aspects of this process are problematic. When the workpiece is very large, supplying enough heat to evenly heat an entire workpiece can be problematic, especially when temperature A is large. Another drawback is the amount of time necessary to heat a workpiece, as heating a workpiece too quickly can induce thermal stresses which are undesirable in high precision components. In cases where the material requires a very high temperature, the part holder and chamber must be constructed of special heat-resistant materials. Additional systems must be added to the device in order to monitor and regulate such high temperatures.

BRIEF SUMMARY

Systems and methods in accordance with embodiments of the present invention can overcome deficiencies and obstacles in existing plasma etching processes by selectively heating portions of a workpiece, and etching those heated portions using a reactive atom process. Such an etching process can be highly-controllable, precise, atmospheric, and non-contact, with a footprint that is smaller and more precise than in existing systems. Further, such an approach can avoid many problems in existing systems wherein the entire workpiece is heated. Such systems and methods can also provide improved processes for rapidly etching hard-to-machine materials using a flame torch or plasma torch in combination with a heat source such as a laser or flame torch.

BRIEF DESCRIPTION OF THE FIGURES

FIG. 2 is a diagram showing the system of FIG. 1 with a laser footprint that is smaller than the effective footprint of the plasma.

FIG. 3 is a diagram showing the system of FIG. 1 with a laser footprint that is larger than the effective footprint of the plasma.

DETAILED DESCRIPTION

Systems and methods in accordance with embodiments of the present invention can circumvent problems associated with heating an entire workpiece to a specified temperature such that the workpiece can be etched using a sub-aperture tool. A heat source having a footprint that is smaller than the size of the workpiece, such as a laser, plasma, or flame can be used to heat a specific portion of the workpiece surface to a desired temperature. Such a process can provide many advantages, and can substantially improve the performance of a sub-aperture plasma-etching process. Applications for such a process can include, for example, any application where a high-aspect ratio hole needs to be created with a diameter that is less than that of a plasma footprint. Such applications can include, for example, applications requiring the drilling of human teeth, which cannot handle the thermal stress induced by lasers alone, and the generation of micro-holes to mark diamonds. The diameters of the resultant micro-holes can be down to about 0.1 micrometers, but for some applications can be on the order of about one micrometer. While using a focused laser beam can effectively create a very small aperture for a plasma, the shape of the laser beam can also be controlled to affect the shape of the plasma footprint. A laser can also raster across a surface in order to heat the surface evenly, or to heat a larger portion of the surface. The length of time necessary to sufficiently heat a surface can vary, such as from nanoseconds to minutes, depending on the size of the heated area, the material, and the desired change in temperature. The temperature change can be perhaps a few hundred degrees or less for most applications, but should typically not heat a material to the stress point or melting point.

Figure 8:
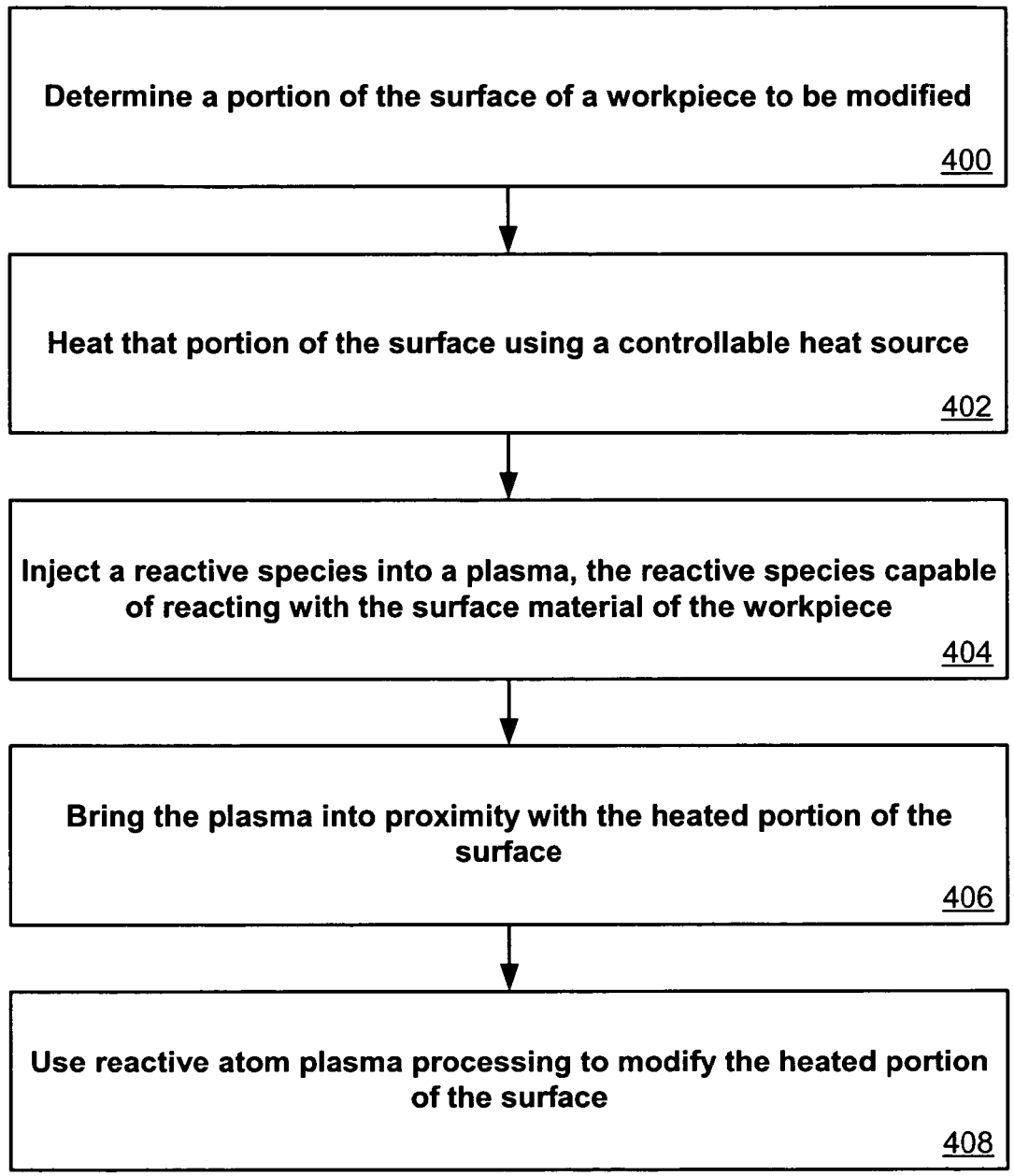
FIG. 8 is a flowchart showing a method that can be used with the system of FIG. 1.

Such an approach can be used advantageously with a reactive atom plasma (RAP) process. RAP processes that can be used in accordance with embodiments of the present invention include those described in pending U.S. patent application Ser. Nos. 10/008,236, 10/383,478, and 10/384,506, which are incorporated herein by reference above. A RAP process can modify the surface of a workpiece, such as a glass optic or semiconductor wafer, by supplying an appropriate reactive precursor gas to the plasma or flame of a torch used to shape, etch, or modify the surface of the workpiece. FIG. 8 shows an exemplary process that can be used in accordance with the present invention. In such a process, a determination is made as to which portion of the surface is to be modified 400. This portion can include, for example, a pattern or a trench to be etched into the surface, or a raised or defect area on the surface that is to be removed. A controllable heat source having a relatively small footprint, such as a laser, flame, or torch, can then pre-heat that portion of the workpiece 402. A controllable heat source is different from a generic heat source, such as a heater or oven, as a controllable heat source heats less than all the surface, and can offer precise control over which portion or portions is heated. A reactive species can be selected that will react with the surface material of the workpiece, and can be injected into a plasma or flame 404. A RAP torch, containing the plasma or flame, can be brought into proximity with that portion of the surface that is to be etched 406, such that reactive atom plasma processing can be used to modify that portion of the surface of the workpiece that was heated by the heat source 408. While a small amount of material may be removed from the non-heated portion(s) of the surface, the removal will occur primarily in those areas that are pre-heated by the heat source. A chemical reaction with the reactive species can cause the heated surface material to form gas phase products that leave the surface. The precursor can be injected into the plasma or flame, which must be of a sufficient temperature to fragment the precursor into a stream of atomic radicals or molecular fragments that can react with the surface material. The torch can then be used to shape, polish, etch, planarize, and/or deposit material on the surface of the workpiece.

Figure 1:
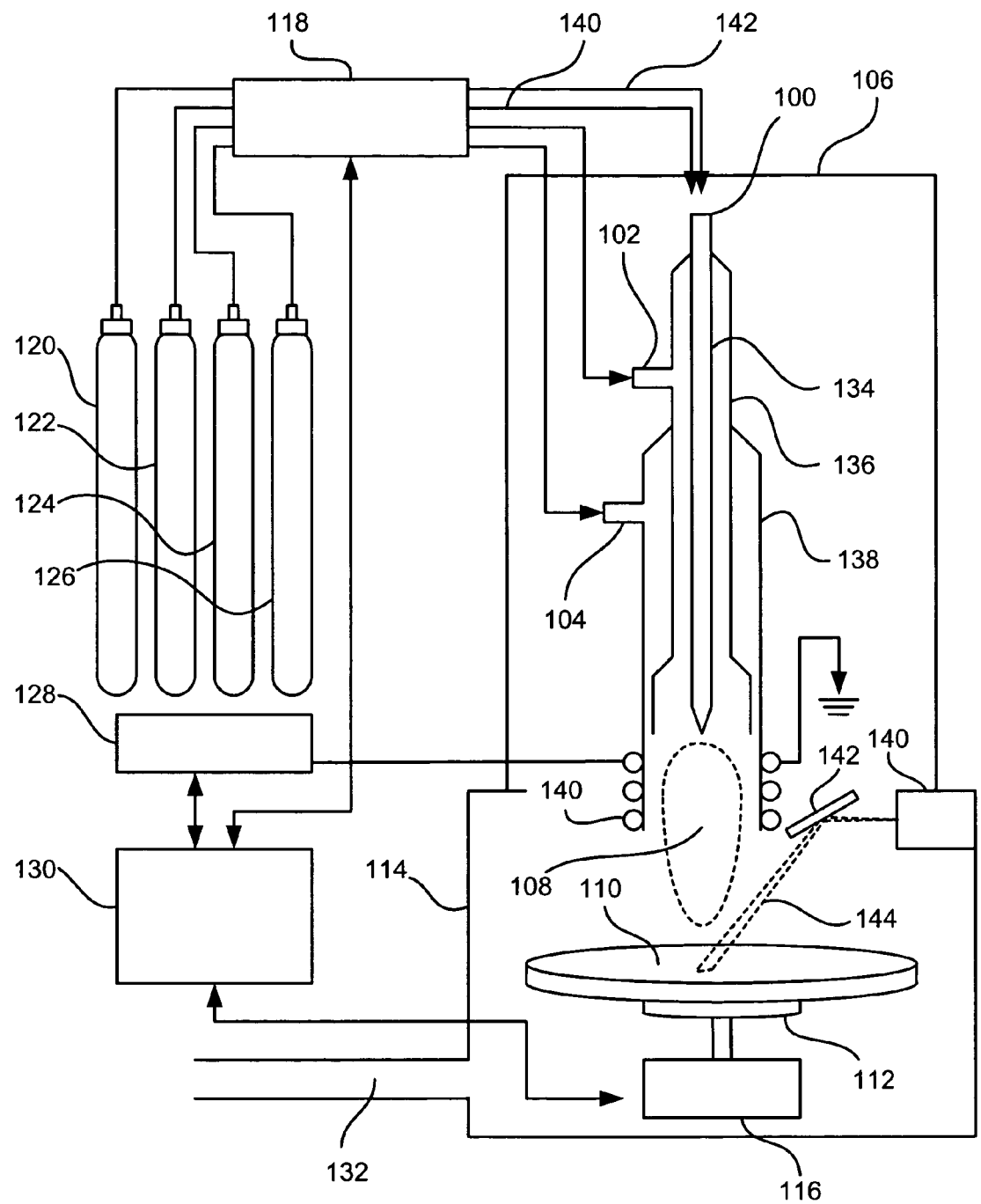
FIG. 1 is a diagram of an ICP torch system that can be used in accordance with one embodiment of the present invention.

For example, FIG. 1 shows a RAP plasma torch that can be used in accordance with embodiments of the present invention. The exemplary torch, shown in a plasma box 106, consists of an inner tube 134, an outer tube 138, and an intermediate tube 136. The inner tube 134 has a gas inlet 100 for receiving a stream of reactive precursor gas 142 from a mass flow controller 118. The torch can utilize different precursor gases during different processing steps. For instance, the torch might utilize a precursor adapted to clean a particular contaminant off a surface in a first step, while utilizing a precursor for redistributing material on the surface of the workpiece during a second step.

The intermediate tube 136 has a gas inlet 102 that can be used to, for example, receive an auxiliary gas from the flow controller 118. The outer tube 138 has a gas inlet 104 that can be used to receive plasma gas from the mass flow controller 118. The mass flow controller 118 can receive the necessary gases from a number of gas supplies 120, 122, 124, 126, and can control the amount and rate of gases passed to the respective tube of the torch. The torch assembly can generate and sustain plasma discharge 108, which can be used to modify the surface of a workpiece 110 located on a chuck 112, which can be located in a workpiece box 114. A workpiece box 114 can have an exhaust 132 for carrying away any process gases or products resulting from, for example, the interaction of the plasma discharge 108 and the workpiece 110.

The chuck 112 in this embodiment is in communication with a translation stage 116, which is adapted to translate and/or rotate a workpiece 110 on the chuck 112 with respect to the plasma discharge 108. The translation stage 116 is in communication with a computer control system 130, such as may be programmed to provide the necessary information or control to the translation stage 116 to allow the workpiece 110 to be moved along a proper path to achieve a desired cleaning, shaping, and/or polishing of the workpiece. The computer control system 130 is in communication with an RF power supply 128, which supplies power to the torch. The computer control system 130 also provides the necessary information to the mass flow controller 118. An induction coil 140 surrounds the outer tube 138 of the torch near the plasma discharge 108. Current from the RF power supply 128 flows through the coil 140 around the end of the torch. This energy is coupled into the plasma.

A controllable mirror 142 can be used to direct a beam 144 from a laser device 140 onto the surface of the workpiece in order to heat a particular area or pattern region on the workpiece 110. The mirror may be any appropriate mirror, such as a plane mirror connected to a stepper motor or a deformable mirror device. The laser can be selected such that the beam does not ablate the workpiece material, as is done in laser machining. Rather, the laser can be used as an ultra-precise surface-heating tool. The material removal portion of the process can be accomplished using a RAP process that "follows" the laser in order to process those areas heated by the laser. In other embodiments, it is possible that the laser forms a heated pattern on the surface of the workpiece, and the RAP torch etches the heated pattern by following a path that does not necessarily follow the pattern. For example, a RAP torch moving across a pre-heated surface can move parallel to pattern lines, perpendicular to pattern lines, or at any other angle depending on the torch movement that makes the most sense for the particular application. Also, the laser does not have to pre-heat the pattern area by following pattern lines, for example, but may use any other appropriate method such as rastering.

Any laser having an appropriate spot size and power can be used to heat a portion of a workpiece surface. Such a laser can be pulsed or continuous wave, and can be tuned to any appropriate wavelength that is within an absorption band of the workpiece material. Such settings can maximize heating efficiency while minimizing reflected and/or transmitted laser light. The wattage of the laser can be adjusted to produce a sufficient workpiece spot temperature, given the appropriate parameters of an etching procedure, such as may include the traverse speed of the part, chamber air flow, and the change in reflectivity as a part is processed. Laser control parameters also can be tied into existing tool path algorithms as needed.

One advantage of heating a small portion of a workpiece surface using a laser with a relatively small footprint, when compared to the mass heating of a surface, is the fact that a laser beam can be projected in many different shapes and patterns. If a laser beam 144 is focused as a spot with a footprint 148 smaller than the sub aperture footprint 146, as shown in FIG. 2 using the RAP torch of FIG. 1, the laser beam can effectively shrink the footprint of the tool, allowing for an on-the-fly variation of footprint size. Extremely small laser spots can be used for intricate micro-machining on a scale never before possible with sub-aperture plasma tools. In some embodiments, the minimum size of the effective footprint is limited only by the minimum spot size of the laser beam (such as about 0.1 micrometers), plasma (such as about 10 to 100 mm), or flame (such as about 10 to 100 mm) used to heat the surface. In other embodiments, apertures or other footprint-reducing devices can be used to further lessen the effective footprint of the tool. If a laser beam 144 is de-focused to bathe an area of the workpiece with a footprint 148 that is larger than the footprint 146 of the torch tool, as shown in FIG. 3, the material can be etched with the 'normal' sub-aperture tool footprint.

Chemistry and Activation Energy

Figure 4:
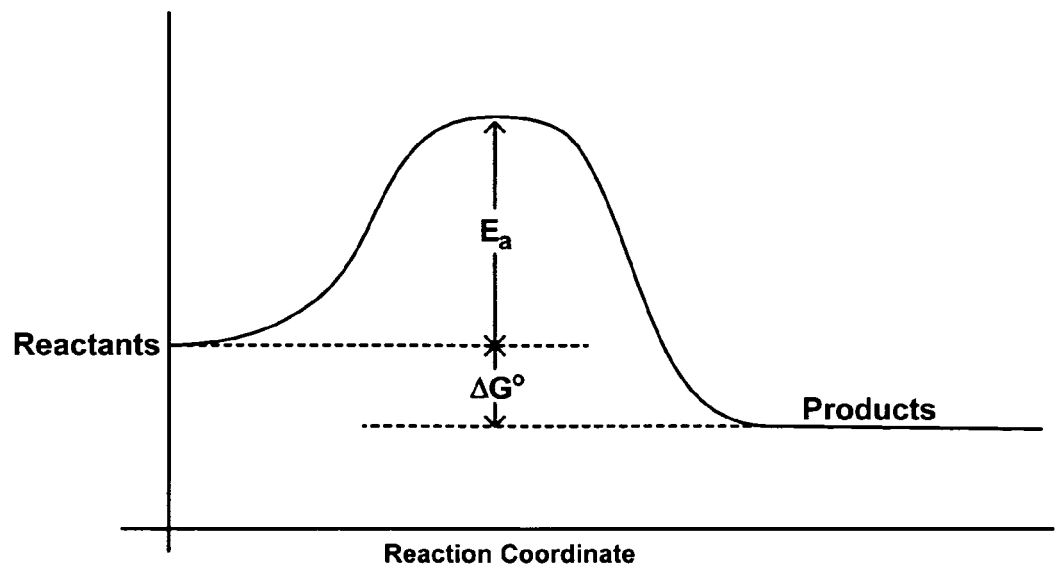
FIG. 4 is a plot showing an exemplary activation energy curve for a material to be etched by a system such as that shown in FIG. 1.

Because a RAP process in an entirely chemical process, a significant chemical principle at play is the activation energy required for a surface reaction to occur. In order to get the reactive species to react with the surface material, such as to form a gas-based product, the activation energy ($E_a$) barrier must be overcome. This 'barrier' is shown, for example, in the plot of FIG. 4. Each reaction can have a different $E_a$. For example, the $E_a$ for silicon carbide is much higher than the $E_a$ quartz. In order to etch a feature such as a trench out of silicon carbide, a torch can be run over the workpiece a number of times in order to warm up the workpiece and approach the $E_a$ barrier. The reactive gas can then be introduced in order to, for example, form a trench in the surface. In one such system, an electric heater can be used to heat up a workpiece. This can add cost and complexity to such a system, however, as it can be necessary to include elements such as a temperature controlled chuck, temperature gauges and regulators, and a device to measure the temperature of any devices on or near the workpiece.

In order to avoid such complexity, a positionable heat source with a small-footprint, such as a laser, flame, or plasma, can be used to warm the desired portion(s) of a workpiece, in order to approach the activation energy. The warmed areas can then be processed with a RAP torch. Such a process can have some significant advantages, as features can be etched into the workpiece that are as small as the amount of the surface that can be heated with the heat source. With a laser, for example, it is possible to generate spot sizes in the micron to sub-micron range. The ability to etch features on a sub-micron scale opens up new applications for RAP processing, such as drilling micro-holes, writing microscopic identification information, or making complex circuit patterns. The features or patterns that are heated by a laser, for example, can be laid down by any appropriate technique, such as following along a pattern path, projecting a static pattern, or rastering over a pattern. Static projections, while potentially quicker than rastering, can require a more powerful laser in some applications. Lasers used for such techniques do not need to be extremely powerful or expensive. For example, silicon carbide can be effectively etched by heating the silicon carbide to approximately 200° C. before applying the reactive plasma. To put this into perspective, a read/write laser in a conventional CD-R/W drive routinely generates temperatures of about 300° C. near the surface of the disk. Although quartz and silicon carbide are listed as example materials, it should be understood that systems and methods in accordance with the present invention can be used with any of a number of materials, including but not limited to diamond, glasses, metals, plastics, silicon nitride, titanium carbide, tungsten carbide, carbon nitride, and other nitrides and carbides.

Figure 5:
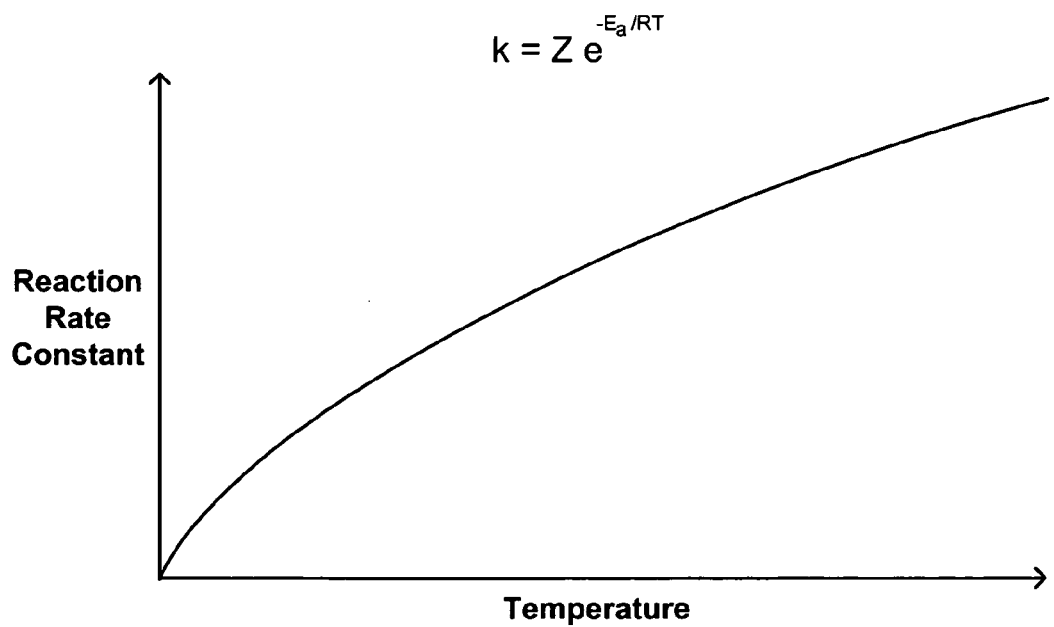
FIG. 5 is a plot showing the reaction rate as a function of temperature for the material of FIG. 4.

Even if a smaller footprint is not desired, a heat source such as a laser can still be used advantageously to increase the reaction rate without heating the entire workpiece. For example, FIG. 5 shows a plot of how the reaction rate increases with the temperature of the reaction area. A laser can be used to project a spot that is at least the size of the torch footprint, such as that shown in FIG. 3. The torch can then follow the laser across the surface using the full footprint of the torch. It is still not necessary to heat the entire workpiece in such an application, although a slightly more powerful laser might be needed.

Shaped footprints

The shape of the effective footprint of a plasma can be controlled in a RAP process or tool, as can be demonstrated with a silicon carbide etch. If a single non-oxygen containing gas such as $CF_4$ is used in the gas flow, whereby the resultant reaction in oxygen-starved, the torch can have a square-shaped footprint that can be used to cut a rectangular trench. Such a trench can be relatively flat on the bottom and fairly steep on the sides. The size of an edge can be on the order of about 100 nm or less in some embodiments. If oxygen is added to the center of the plasma, and some fuel is given to the center reaction, a Gaussian-shaped can re-appear. Injecting a small amount of oxygen into the plasma, or "poisoning" the plasma when using a gas such as $CF_4$, can shift the equilibrium in the direction of additional fluorine radicals. This can be one of the mechanisms used to achieve favorable results with silicon carbide. If the chemistry is not properly controlled, however, white deposits of glass can form on the top of the silicon carbide. The addition of oxygen need not be continuous, but can involve pulsing, controlled, or intermittent injection.

Other RAP Systems

In addition to an ICP plasma torch, other RAP torches can be utilized in accordance with embodiments of the present invention, such as a simple flame or flame torch. In one example, a hydrogen-oxygen ($H_2/O_2$) flame can be adjusted to burn with an excess of oxygen. A device using such a simple flame can be cheaper, easier to develop and maintain, and significantly more flexible than an ICP device. A flame is struck on such a flame torch, and a reactive precursor is supplied to the flame. The surface of the workpiece can then be modified by allowing radicals or fragments of the reactive precursor to combine with the heated portions of the workpiece surface to produce a gas and leave the surface.

Figure 6A:
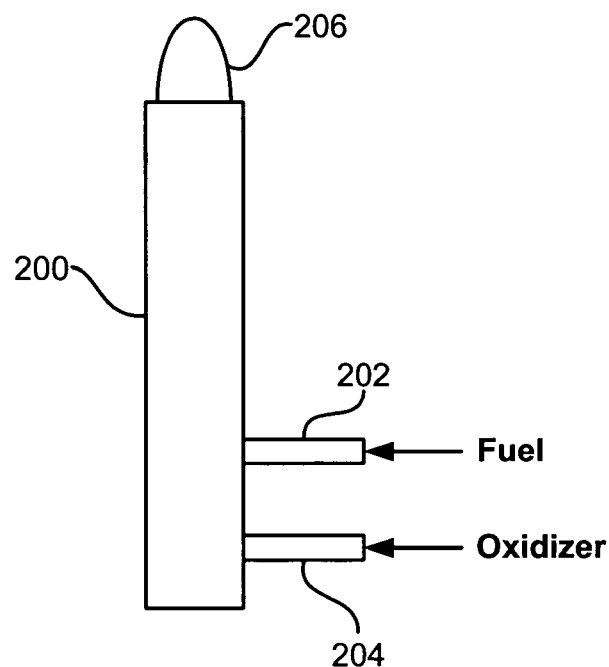
FIGS. 6(a) and 6(b) are diagrams of a torch that can be used in accordance with another embodiment of the present invention.

Such a flame torch can be designed in several ways. In the relatively simple design of FIG. 6(a), a reactive precursor gas can be mixed with either the fuel or the oxidizer gas before being injected into the torch 200 through the fuel input 202 or the oxidizer input 204. Using this approach, a standard torch could be used to inject the precursor into the flame 206. Depending on the reactive precursor, the torch head might have to be made with specific materials. For example, mixing chlorine or chlorine-containing molecules into an $H_2/O_2$ torch can produce reactive chlorine radicals.

Figure 6B:
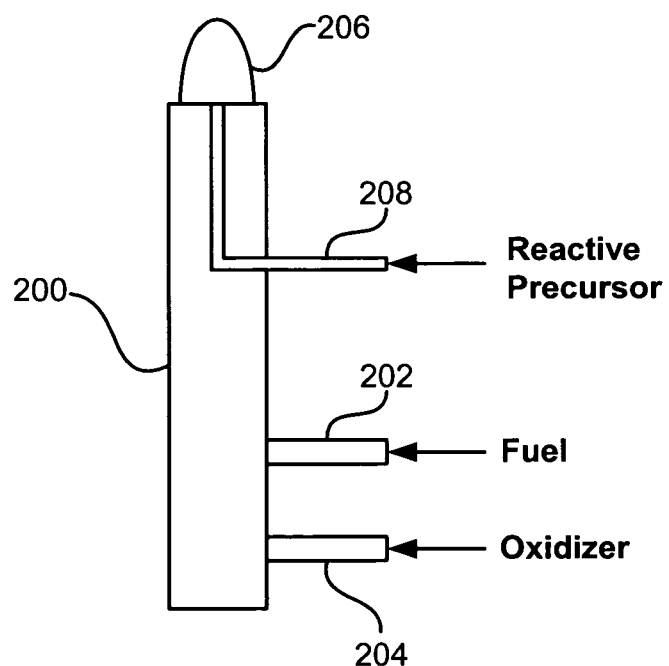

The slightly more complex exemplary design of FIG. 6(b) can introduce the reactive precursor gas into the flame 206 using a small tube 208 in the center of the torch 200 orifice. The flame 206 in this case is usually chemically balanced and is neither a reducing nor oxidizing flame. In this design a variety of gases, liquids, or solids can be introduced coaxially into the flame to produce reactive components. The torch in this embodiment can produce, for example, O, Cl, and F radicals from solid, liquid, and gaseous precursors.

In any of the above cases, a stream of hot, reactive species can be produced that can chemically combine with the surface of a part or workpiece. When the reactive atoms combine with the contaminants, a gas is produced that can leave the surface.

While a RAP system can operate over a wide range of pressures, the most useful implementation can involve operation at or near atmospheric pressure, facilitating the treatment of large workpieces that cannot easily be placed in a vacuum chamber. The ability to work without a vacuum chamber can also greatly increase throughput and reduce the cost of the tool that embodies the process.

A flame system can easily be used with a multi-nozzle burner or multi-head torch to quickly cover large areas of the surface. For other applications, a small flame can be produced that affects an area on the surface as small as about 0.2 mm full width-half maximum (FWHM) for a Gaussian- or nearly Gaussian-shaped tool. Another advantage of the flame system is that it does not require an expensive RF power generator nor shielding from RF radiation. In fact, it can be a hand-held device, provided that adequate exhaust handing equipment and user safety devices are utilized. Further, a flame torch is not limited to a $H_2/O_2$ flame torch. Any flame torch that is capable of accepting a source of reactive species, and fragmenting the reactive species into atomic radicals that can react with the surface, can be appropriate.

Figure 7:
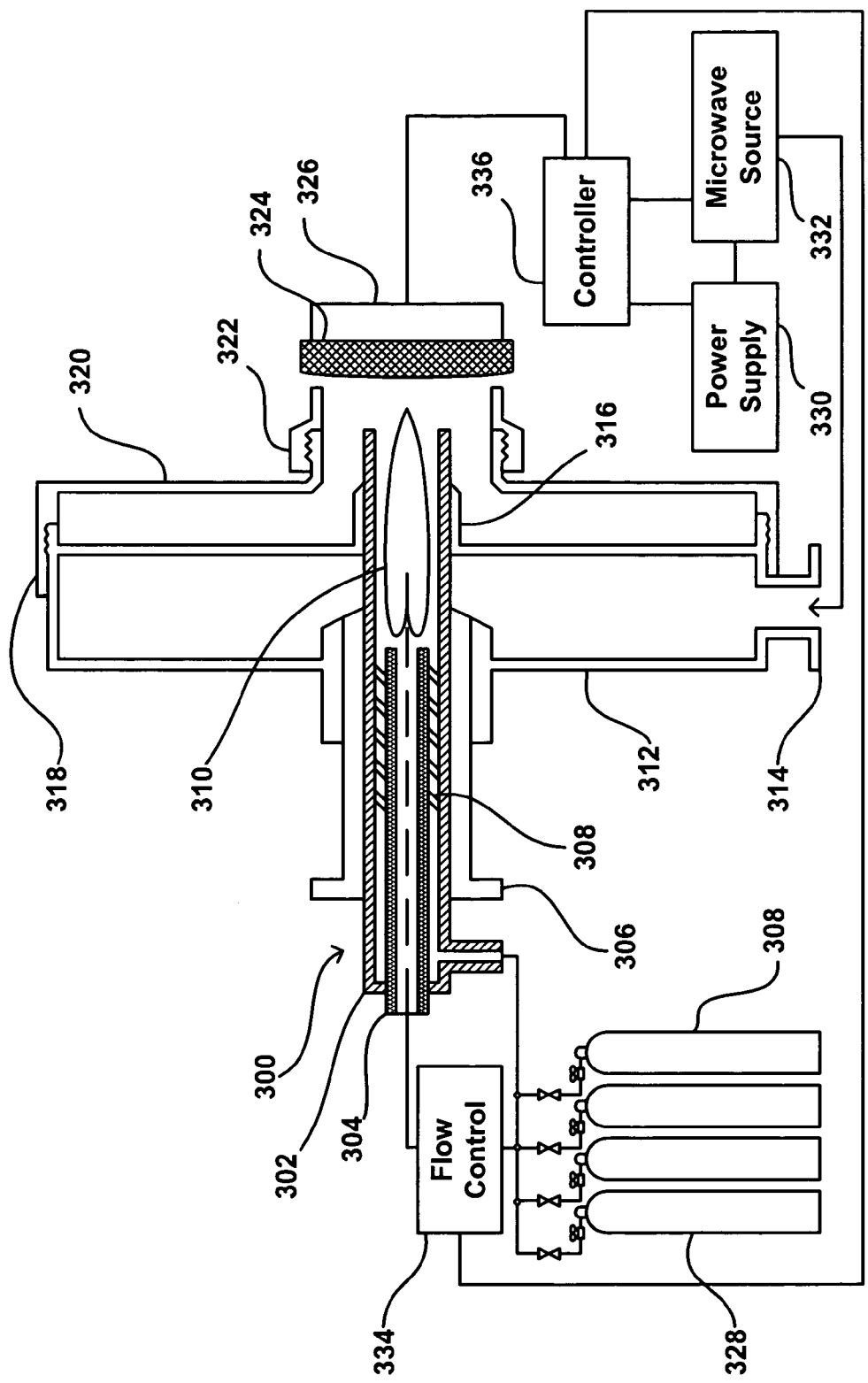
FIG. 7 is a diagram of an MIP torch system that can be used in accordance with another embodiment of the present invention.

As shown in FIG. 7, another RAP system that can be used in accordance with the present invention utilizes a microwave-induced plasma (MIP) source. An MIP source has proven to have a number of attributes that complement, or even surpass in some applications, the use of an ICP tool or a flame as an atomization source. The plasma can be contained in a quartz torch 300, which is distinguished from a standard ICP by the use of two concentric tubes instead of three. With a large enough bore, a torroidal plasma can be generated and the precursor injected into the center of the torch in a manner analogous to the ICP.

A helical insert 308 can be placed between the outer tube 302 and the inner tube 304 of the torch 300 to control tube concentricity, as well as to increase the tangential velocity of gas. The vortex flow can help stabilize the system, and the high velocity can aid in cooling the quartz tubes 302, 304.

The main portion of the microwave cavity 312 can be any appropriate shape, such as a circular or cylindrical chamber, and can be machined from a highly conductive material, such as copper. The energy from a 2.45 GHz (or other appropriate) power supply 330 can be coupled into the cavity 312 through a connector 314 on one edge of the cavity. The cavity 312 can be tuned in one embodiment by moving a hollow cylindrical plunger 306, or tuning device, into or out of the cavity 312. The quartz torch 300 is contained in the center of the tuning device 306 but does not move while the system is being tuned.

An external gas sheath 320 can be used to shield the plasma 320 from the atmosphere. The sheath 320 confines and can contribute to the longevity of the reactive species in the plasma, and can keep the atmospheric recombination products as low as practically possible. In one embodiment, the end of the sheath 320 is approximately coplanar with the open end, or tip, of the torch 300. The sheath 320 can be extended beyond the tip of the torch 300 by installing an extension tube 322 using a threaded flange at the outlet of the sheath 320. The sheath itself can be threadably attached 318 to the main cavity 312, which can allow a fine adjustment on height to be made by screwing the sheath either toward or away from the cavity 312.

A supply of process gas 328 can provide process gas to both tubes 302, 304 of the torch 300. In one embodiment this process gas is primarily composed of argon or helium, but can also include carbon dioxide, oxygen or nitrogen, as well as other gases, if the chemistry of the situation permits. Gas flows in this embodiment can be between about one and about ten liters per minute. Again, the gases introduced to the torch can vary on the application. Reactive precursor gas(es) can be introduced to clean a surface, for example, followed by a different precursor gas(es) to shape or otherwise modify the surface of the workpiece. This allows a workpiece to be cleaned and processed in a single chamber without a need to transfer the workpiece to different devices to accomplish each objective.

Chemistry

A reactive atom plasma process in accordance with embodiments of the present invention is based, at least in part, on the reactive chemistry of atomic radicals and reactive fragments formed by the interaction of a non-reactive precursor chemical with a plasma. In one such process, the atomic radicals formed by the decomposition of a non-reactive precursor interact with material of the surface of the part being modified. The surface material is transformed to a gaseous reaction product and leaves the surface. A variety of materials can be processed using different chemical precursors and different plasma compositions. The products of the surface reaction in this process must be a gas under the conditions of the plasma exposure. If not, a surface reaction residue can build up on the surface which will impede further etching.

In the above examples, the reactive precursor chemical can be introduced as a gas. Such a reactive precursor could also be introduced to the plasma in either liquid or solid form. Liquids can be aspirated into the plasma and fine powders can be nebulized by mixing with a gas before introduction to the plasma. RAP processing can be used at atmospheric pressure. RAP can be used as a sub-aperture tool to precisely modify surfaces.

A standard, commercially-available two- or three-tube torch can be used. The outer tube can handle the bulk of the plasma gas, while the inner tube can be used to inject the reactive precursor. Energy can be coupled into the discharge in an annular region inside the torch. As a result of this coupling zone and the ensuing temperature gradient, a simple way to introduce the reactive gas, or a material to be deposited, is through the center. The reactive gas can also be mixed directly with the plasma gas, although the quartz tube can erode under this configuration and the system loses the benefit of the inert outer gas sheath.

Injecting the reactive precursor into the center of the excitation zone has several important advantages over other techniques. Some atmospheric plasma jet systems, such as ADP, mix the precursor gas in with the plasma gas, creating a uniform plume of reactive species. This exposes the electrodes or plasma tubes to the reactive species, leading to erosion and contamination of the plasma. In some configurations of PACE, the reactive precursor is introduced around the edge of the excitation zone, which also leads to direct exposure of the electrodes and plasma contamination. In contrast, the reactive species in the RAP system are enveloped by a sheath of argon, which not only reduces the plasma torch erosion but also reduces interactions between the reactive species and the atmosphere.

The inner diameter of the outer tube can be used to control the size of the discharge. On a standard torch, this can be on the order of about 18 to about 24 mm. The size can be somewhat frequency-dependent, with larger sizes being required by lower frequencies. In an attempt to shrink such a system, torches of a two tube design can be constructed that have an inner diameter of, for example, about 14 mm. Smaller inner diameters may be used with microwave excitation, or higher frequency, sources.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for selectively etching a workpiece, comprising:
   heating a portion of the workpiece using a laser; and
   applying a reactive atom plasma torch to the heated portion;
   reacting the heated portion with reactive species of the reactive atom plasma torch to modify the heated portion;
   wherein the reaction is substantially confined to the heated portion.

2. A method according to claim 1, further comprising:
   supplying a reactive precursor to the reactive atom plasma torch.

3. A method according to claim 2, wherein:
   reacting the heated portion causes the heated portion to chemically combine with reactive species produced from the reactive precursor and leave the surface of the workpiece.

4. A method according to claim 2, further comprising:
   producing a stream of atomic radicals from said reactive precursor.

5. A method according to claim 2, further comprising:
   controlling mass flow of the reactive precursor into the plasma.

6. A method according to claim 2, further comprising:
   selecting a concentration of the reactive precursor to be introduced into the plasma.

7. A method according to claim 1, further comprising:
   bringing the reactive atom plasma torch into proximity with the surface of the workpiece.

8. A method according to claim 1, further comprising:
   supplying a source of fuel to the reactive atom plasma torch.

9. A method according to claim 1, further comprising:
   supplying a source of oxidizer gas to the reactive atom plasma torch.

10. A method according to claim 1, further comprising:
    altering the surface of the workpiece chemically with the plasma.

11. A method according to claim 1, further comprising:
    using reactive plasma processing to shape the surface of the workpiece.

12. A method according to claim 1, further comprising:
    rotating the workpiece with respect to the reactive atom plasma torch.

13. A method according to claim 1, further comprising:
    operating the plasma at about atmospheric pressure.

14. A method according to claim 1, further comprising:
    polishing the surface of the workpiece with the plasma.

15. A method according to claim 1, further comprising:
    planarizing the surface of the workpiece with the plasma.

16. A method according to claim 1, further comprising:
    using multiple plasmas to speed up surface modification.

17. A method according to claim 1, wherein:
    footprint of the laser is smaller than footprint of the reactive atom plasma torch.

18. A method according to claim 1, further comprising:
    directing a beam of the laser via a controllable mirror.

19. A method according to claim 18, wherein:
    the laser is one of a pulsed wave laser and a continuous wave laser.

20. A method according to claim 18, further comprising:
    tuning the laser to a wavelength that is within an absorption band of the material of the workpiece.

21. A method according to claim 18, further comprising:
    adjusting the wattage of the laser to produce a sufficient workpiece spot temperature.

22. A method according to claim 1, wherein:
    heating a portion of the surface of a workpiece includes heating that portion to approach activation energy of material of the workpiece.

23. A method for etching a surface of a workpiece, comprising:
    heating a portion of the surface of a workpiece using a laser;
    supplying reactive species to a flame from a plasma torch; and
    using the flame to etch the heated portion of the workpiece, the heated portion of the surface capable of chemically combining with the reactive species to leave the surface;
    wherein the etched surface is substantially confined to the heated portion.

24. A method according to clam 23, further comprising:
    moving the flame relative to the surface of the workpiece.

25. A method according to claim 23, wherein:
    footprint of the laser is smaller than footprint of the reactive atom plasma.

26. A method according to claim 23, further comprising:
    directing a beam of the laser via a controllable mirror.

27. A method for etching a pattern into the surface of a workpiece, comprising:
    heating a portion of the surface of a workpiece using a laser, the portion corresponding to a pattern to be etched;
    applying a reactive atom plasma torch to the heated portion; and
    reacting the heated portion with reactive species of a reactive atom plasma torch to etch the heated portion of the surface;
    wherein the pattern is substantially confined to the heated portion.

28. A method according to claim 27, further comprising:
    selecting a reactive species that will chemically combine with material of the surface.

29. A tool for cleaning the surface of a workpiece, comprising:

a laser that can heat a portion of a workpiece;

a flame torch; and a translator that can translate at least one of a workpiece and said torch;

wherein said torch is configured to receive a reactive precursor capable of chemically combining with a heated portion of the surface of the workpiece to produce a gas and leave the surface;

wherein the reaction is substantially confined to the heated portion.

* * * * *